US009331949B2

(12) United States Patent
Takebe et al.

(10) Patent No.: US 9,331,949 B2
(45) Date of Patent: May 3, 2016

(54) CONTROL NETWORK MANAGEMENT SYSTEM

(75) Inventors: Tatsuaki Takebe, Musashino (JP); Hisanori Hayashi, Musashino (JP)

(73) Assignee: YOKOGAWA ELECTRIC CORPORATION, Tokyo (JP)

( * ) Notice: Subject to any disclaimer, the term of this patent is extended or adjusted under 35 U.S.C. 154(b) by 571 days.

(21) Appl. No.: 12/984,248

(22) Filed: Jan. 4, 2011

(65) Prior Publication Data

US 2011/0164551 A1   Jul. 7, 2011

(30) Foreign Application Priority Data

Jan. 6, 2010   (JP) ................................ 2010-001205

(51) Int. Cl.
| | |
|---|---|
| H04W 40/00 | (2009.01) |
| H04L 12/851 | (2013.01) |
| H04L 12/801 | (2013.01) |
| H04L 12/833 | (2013.01) |
| H04L 12/725 | (2013.01) |

(52) U.S. Cl.
CPC ............ *H04L 47/2408* (2013.01); *H04L 47/10* (2013.01); *H04L 47/14* (2013.01); *H04L 47/2458* (2013.01); *H04L 45/302* (2013.01); *H04W 40/00* (2013.01)

(58) Field of Classification Search
CPC . H04L 47/10; H04L 47/2408; H04L 47/2458; H04L 47/14; H04L 45/302; H04W 40/00
USPC .................. 370/315; 726/22, 26, 27
See application file for complete search history.

(56) References Cited

U.S. PATENT DOCUMENTS

| | | | |
|---|---|---|---|
| 2005/0068924 A1* | 3/2005 | Lindskog et al. ............. | 370/338 |
| 2007/0268884 A1 | 11/2007 | Kolavennu et al. | |
| 2008/0089237 A1* | 4/2008 | Molen et al. ................... | 370/252 |
| 2008/0137565 A1* | 6/2008 | Chen ................... | H04L 45/3065 370/310 |
| 2009/0010205 A1* | 1/2009 | Pratt et al. ...................... | 370/328 |
| 2009/0257354 A1* | 10/2009 | Hannel et al. ................. | 370/241 |
| 2011/0164551 A1* | 7/2011 | Takebe et al. ................. | 370/315 |

OTHER PUBLICATIONS

European Search Report dated Apr. 7, 2011, issued in corresponding European Patent Application No. 10197326.1.
"Integrating an Industrial Wireless Sensor Network with Your Plant's Switched Ethernet and IP Network", Apr. 2009, pp. 1-18, XP002630255, Retrieved from Internet: URL:http://www.cisco.com/web/strategy/docs/manufacturing/swpIIWS_Emerson_wp.pdf [retrieved on Mar. 25, 2011]. cited in European Search Report.

* cited by examiner

*Primary Examiner* — Luat Phung
(74) *Attorney, Agent, or Firm* — Westerman, Hattori, Daniels & Adrian, LLP

(57) ABSTRACT

A control network management system for relaying first and second wireless communications comprises a first repeater having a packet control means for writing priority information in a header of communication packet data of the first wireless communication, as received and transmitting the communication packet data with a hash value of the header, added thereto, a second repeater having a packet control means for zero-clearing priority information in a header of communication packet data of the second wireless communication, as received, or changing the priority information to a predetermined value before transmitting the communication packet data with a hash value of the header, added thereto, and a third repeater having a priority control means for applying priority control to the header of the communication packet data received from the first repeater or the second repeater, on the basis of priority information, thereby transmitting the communication packet data to a control system.

6 Claims, 3 Drawing Sheets

CONTROL NETWORK MANAGEMENT SYSTEM

This application claims priority from Japanese Patent Application No. 2010-001205, filed on Jan. 6, 2010, the entire contents of which are herein incorporated by reference.

BACKGROUND

1. Technical Field

The present invention relates to a control network management system for relaying a first wireless communication in conformity with IP (Internet Protocol) and a process control wireless communication standard, and a second wireless communication in conformity with IP and a wireless communication standard differing from the process control wireless communication standard, and in particular, to a control network management system capable of avoiding tampering, and so forth, attempted by a mala fide third party, and allowing a signal of a process control wireless communication of which highly real-time responsiveness is required while guaranteeing priority, and a signal of which real time responsiveness is not required so much to coexist in the same network.

2. Related Art

It has since been proposed that a process control system in, for example, industrial automation is constituted as a wireless control network system making use of wireless communication.

The reason for this is that since a related-art control system is configured as a wired network, it has been impossible to install field devices such as sensors for measuring temperature, a flow rate, and so forth, respectively, at optimum locations inside a plant owing to limitations to a communication distance, constraints to routing of wiring, and so forth, resulting in deterioration in control accuracy, and the wireless control network system is therefore proposed in order to obviate such inconvenience.

Further, there has been proposed a control network management system for controlling the operation of the wireless control network system, and optimizing the operation of a plant in whole.

The field devices include various field devices such as, for example, a differential pressure gage, a flow meter, a thermometer, a monitoring camera, an actuator, a controller, and so forth.

There has lately been seen a move for attempting to incorporate wireless technologies into various industrial sectors including a process control sector, and wireless communication standards as well have been under studies. More specifically, under study at present are Wireless HART provided under HART (Highway Addressable Remote Transducer) 7, and a process control wireless communication standard ISA100. 11a, approved by ISA 100 committee of ISA (International Society of Automation). The WirelessHART, and ISA100. 11a each are a protocol/standard of industrial wireless communication for execution of frequency division communication, and the contents of arrangements concerning respective communications are explained in, for example, the following documents;

Document 1: Wireless systems for industrial automation: Process control and related applications Document 2: Control with WirelessHART (URL: http://www.hartcom. org/protocol/training/resources/wiHART_resources/Control_with_wirelessH ART.pdf)

The WirelessHART, and ISA100. 11a are adopted for a wireless control network system in conformity with IEEE (Institute of Electrical and Electronic Engineers) 802. 15. 4, where a large number of field devices are installed by taking advantage of small size • and power-saving feature of the respective field devices.

Meanwhile, there has also been proposed a wireless communication system making use of "Wi-Fi (Wireless Fidelity)" technology (hereinafter referred to as Wi-Fi wireless communication) in conformity with IEEE 802.11a/IEEE 802.11b since some time ago.

As the Wi-Fi communication, there has been proposed a wireless communication system in a process control system, connected with a maintenance terminal for a maintenance operation by a worker on a job site, and field devices such as a monitoring camera of which communication of massive date (for example, statistical data, a moving picture screen, a still picture screen, various image data, and so forth) is required.

For some time up to now, there have been under study a repeater for controlling the operation of a wireless control network system by making use of both wireless communication in conformity with the WirelessHART, ISA100. 11a, and wireless communication in conformity with the Wi-Fi communication to thereby relay both the communications in order to optimize the operation of a plant as a whole, and a control network management system using the repeater.

For example, U.S. Patent Application No. 20070268884A relates to a related-art network management system.

The above U.S. patent application features a technology concerning a mechanism for a wireless system for execution of frequency hopping, being compatible with a Wi-Fi wireless communication system, using a communication frame, wherein respective communication time zones of both the systems are divided from each other, thereby providing a guard interval (blank time for prevention of interference) therebetween.

In the above related-art control network management system, highly real-time responsiveness (for example, response within 10 ms, and so forth) is required of the process control wireless communication (the wireless communication in conformity with the WirelessHART and ISA100. 11a, respectively) in order to execute transmit/receive of various control data (a flow rate, a pressure value, and so forth) necessary for carrying out an optimum operation of a plant and so forth.

On the other hand, real-time responsiveness higher than that required in the case of the WirelessHART and ISA100. 11a is not required of the Wi-Fi wireless communication.

With the related-art control network management system, however, there has existed a problem in that even if priority control is applied to the process control wireless communication among the process control wireless communication, and the Wi—Fi wireless communication in order to secure the quality of the process control wireless communication of which particularly high real-time responsiveness is required, there is a possibility that communication according to priority cannot be executed due to information for deciding priority being intercepted by a mala fide third party to be thereby subjected to tampering because anyone can gain access to the relevant wireless communication. This problem is specifically described hereunder.

For some time up to now, there has been under study a repeater for realizing a mechanism wherein a wireless network system of the process control wireless communication, of which the highly real-time responsiveness is required, is compatible with the Wi-Fi wireless communication system of which the real-time responsiveness higher than that required in the case of the process control wireless communication is not required, and a control network management system using the repeater.

With the related-art technology, in particular, there has been under study use of a priority control function, generally called QoS (Quality of Service), as a function mounted in a repeater, such as a router, a LAN switch, and so forth, in order to secure the quality of the process control wireless communication more important than the Wi-Fi wireless communication.

More specifically, a method whereby a repeater decides priority includes a method for a repeater explicitly designating priority by making use of a field prepared in the header of communication packet data.

For example, relatively high priority information is written in a TOS (Type of Service) field, or a DSCP (Differentiated Services Code Point) field of an IP (Internet Protocol) packet by terminals or field devices, making up a network, whereupon a repeater executes prioritization on the basis of the priority information (TOS, or DSCP).

For example, when any of a plurality of terminals making up a network, or any of a plurality of field devices making up a network prepares communication packet data relating to data of high real-time characteristic, such as voice communication data, or process control data (control data such as pressure, a flow rate, and so forth), a repeater writes priority information in the TOS field, or the DSCP field, prepared in the header (IP Header) of packet data in communications in conformity with IP.

The repeater controls transmission timing of the packet data on the basis of the priority information written in the TOS field, or the DSCP field, prepared in the IP Header of the communication packet data received from the terminal, or the field device.

That is, the repeater transmits the communication packet data as received, in order of decreasing precedence. Even if packets lower in precedence build up internally (in a storage means), the repeater sends them out in order of decreasing precedence on the basis of the priority information.

As a result, with the related-art control network management system, it has been possible to provide high quality communications of which relatively high real-time responsiveness is required by the action of the repeater, for explicitly designating priority, making use of fields prepared in the header of the communication packet data, in the method for the repeater deciding priority.

FIGS. 3(A), 3(B) each are a schematic representation showing a format of related-art communication packet data, in which FIG. 3(A) is the schematic representation showing the communication packet data in whole, and FIG. 3(B) is the schematic representation for explaining about an IP header thereof. In FIG. 3(A), the communication packet data is made up of a TOS field, a DSCP field, an IP header, and IP data, and as shown in FIG. 3(B), the IP header is provided with the TOS field corresponding to 1 octet.

With the related-art control network management system described as above, however, even if the priority control is executed in order to secure high real-time responsiveness of the process control wireless communication, a problem has existed in that there is a possibility that communications according to priority cannot be implemented because anyone can gain access to the relevant wireless communication, and the wireless communication is intercepted by a mala fide third party, and information for deciding priority is subjected to tampering.

More specifically, with the related-art control network management system, in the case of executing the priority control on the assumption that the Wi-Fi wireless communication, and the process control wireless communication (signals thereof) are allowed to coexist in the same network without any countermeasures taken into consideration, if, for example, the communication packet data of the process control wireless communication is intercepted by a mala fide third party who has invaded from the Wi-Fi wireless communication to be re-transmitted after a portion expressing a priority {TOS (Type of Service) corresponding to 1 octet, in (FIG. 3B)} of the communication packet data have been subjected to tampering, this will cause communication packet data to be transmitted on the basis of priority information after the tampering, thereby causing a problem that security on priority is not provided at all, and it is impossible to carry out the optimal operation of a target for control, in a plant, and so forth.

In other words, a problem has existed in that there is a possibility of the system being under a replay attack that is an attack technique whereby a third party eavesdrops on contents of the communication, and transmits contents identical to the contents of the communication packet data of the process control wireless communication, thereby gaining an irregular access.

SUMMARY OF THE INVENTION

Exemplary embodiments of the present invention address the above disadvantages and other disadvantages not described above. However, the present invention is not required to overcome the disadvantages described above, and thus, an exemplary embodiment of the present invention may not overcome any disadvantages.

It is one of illustrative aspects of the present invention to solve those problems, and to realize a control network management system capable of avoiding tampering, and so forth, attempted by a mala fide third party, in particular, and allowing a signal of a process control wireless communication of which highly real-time responsiveness is required while guaranteeing priority, and a signal of which real time responsiveness is not required so much to coexist on the same network.

According to one or more illustrative aspects of the invention, there is provided the control network management system for relaying a first wireless communication in conformity with IP (Internet Protocol) and a process control wireless communication standard, and a second wireless communication in conformity with IP, and a wireless communication standard differing from the standard, the control network management system comprising a first repeater having a packet control means for writing priority information in a header of communication packet data of the first wireless communication, as received and transmitting the communication packet data with a hash value of the header, added thereto, a second repeater having a packet control means for zero-clearing part, or a whole of priority information in a header of communication packet data of the second wireless communication, as received, or changing the priority information to a predetermined value before transmitting the communication packet data with a hash value of the header, added thereto, and a third repeater having a priority control means for applying priority control to the header of the communication packet data received from the first repeater or the second repeater, on the basis of priority information, thereby transmitting the communication packet data to a control system.

DETAILED DESCRIPTION OF EXEMPLARY EMBODIMENTS

A control network management system according to the invention has a feature in that the control network management system is provided with a first repeater comprising a packet control means for writing priority information on a header of communication packet data of a process control wireless communication (hereinafter referred to as a first wireless communication), such as mainly, WirelessHART, ISA100. 11a, and so forth, thereby transmitting the communication packet data with a hash value of the header, added thereto, a second repeater comprising a packet control means for zero-clearing a part, or the whole of priority information in the header of communication packet data of communication of the Wi-Fi communication • other than the process control wireless communication, or changing the same to a predetermined value before transmitting the communication packet data with a hash value of the header, added thereto, and a third repeater comprising a priority control means for applying priority control to headers of respective communication packet data blocks received from the first repeater or the second repeater on the basis of the priority information, thereby transmitting communication packet data to a control system.

Figure 1:
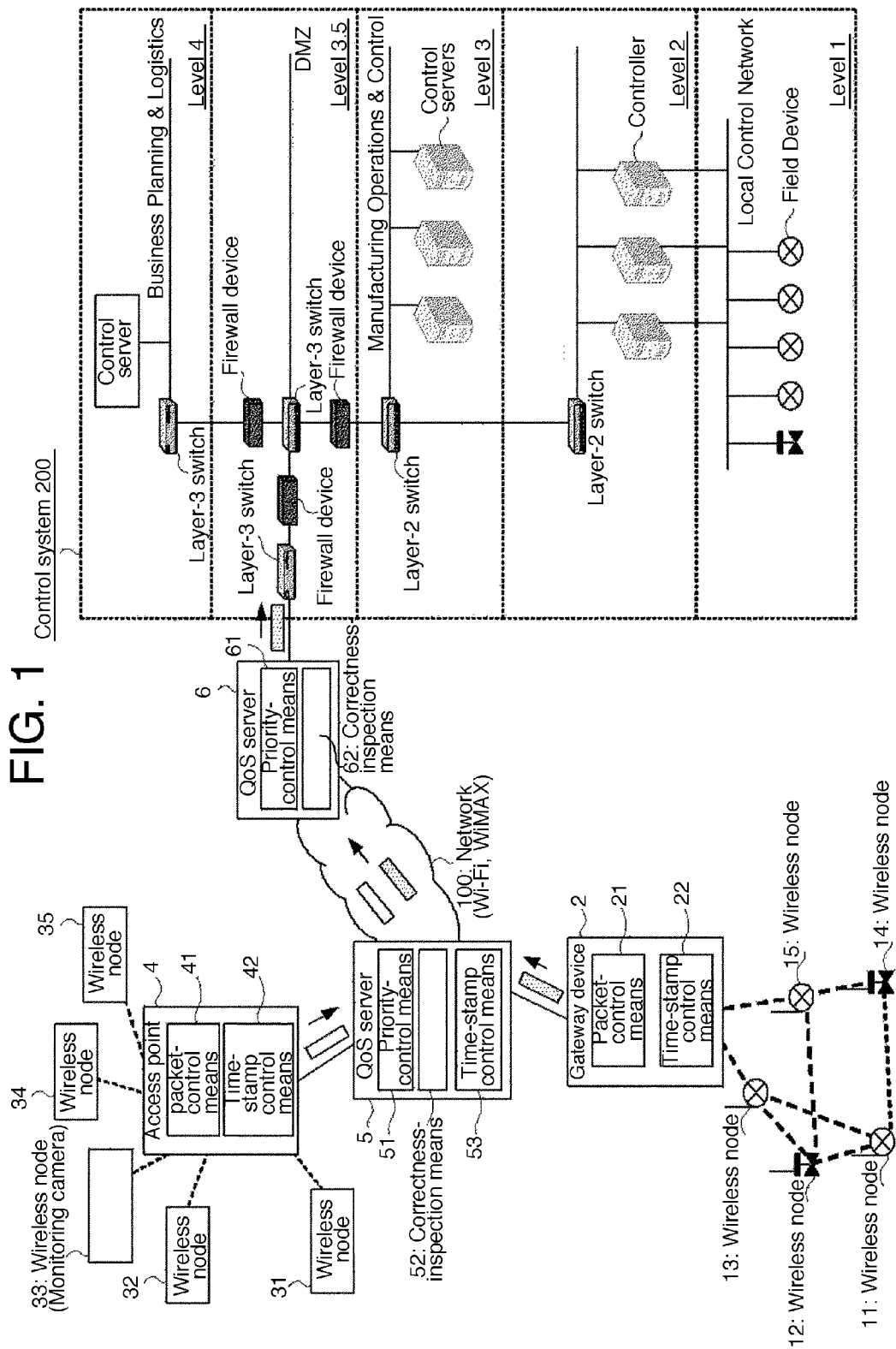
FIG. 1 is a block diagram showing one embodiment of a control network management system according to the invention.

FIG. 1 is a block diagram showing one embodiment of a control network management system according to the invention. In FIG. 1, the control network management system according to the invention is comprised mainly of wireless nodes 11 to 15, each thereof, being a field device having a sensor function for measuring a physical quantity, such as, for example, temperature, a flow rate, and so forth, or an actuator function for controlling a control valve, further the field device representing one example of a plurality of first wireless communication terminals, having a wireless communication function for wireless transfer of various measurement data blocks through wireless communications according to the communication standard ISA100. 11a (or WirelessHART), a gateway (hereinafter referred to as GW) 2, representing one example of a first repeater for transferring the respective communication packet data blocks received from the wireless nodes 11 to 15, wireless nodes 31 to 35 (in the figure, shown as Wi-Fi nodes), each thereof, being a field device, such as a maintenance terminal for maintenance work to be performed by a worker at a job site, a monitoring camera of which communication of massive data (for example, statistical data, a moving image, a still image, various image data blocks, and so forth) is required, and so forth, further the field device representing one example of a plurality of second wireless communication terminals, having wireless communication function for wireless transfer of various measurement data blocks • voice data blocks through the Wi-Fi wireless communication, an access point (hereinafter referred to as AP) 4 representing one example of a second repeater for transferring the respective communication packet data blocks received from the wireless nodes 31 to 35, a QoS (Quality of Service) server 5 representing one example of a third repeater such as a router, a switch, and so forth, for executing communications with the GW2, and the AP4, and applying priority control to the respective communication packet data blocks as received before relaying (transferring), a network 100 for wireless transfer of the communication packet data blocks, such as the various measurement data blocks, the control data locks, and so forth, by the Wi-Fi wireless communication, and a QoS server 6 representing one example of a fourth repeater, such as a router, a switch, and so forth, for applying priority control to the communication packet data blocks received via the network 100 before relaying (transferring) to a control system 200.

Wireless communications in conformity with IP and the process control wireless communications standard (ISA100. 11a or WirelessHART), is hereinafter referred to as the first wireless communication, while wireless communications in conformity with IP and wireless communications standard (the Wi-Fi wireless communication, and so forth) differing from the process control wireless communications standard is hereinafter referred to as the second wireless communication.

The wireless nodes 11 to 15 each are a field device having the sensor function for measuring the physical quantity, such as temperature, a flow rate, and so forth, or the actuator function for controlling a control valve, for executing transmit/receive of the various measurement data blocks on the basis of a predetermined control process according to ISA100. 11a as one example of the process control wireless communication standard, and so forth.

Those wireless nodes 11 to 15 each execute the first wireless communication in conformity with IP (Internet Protocol), and the process control wireless communication standard, thereby constructing a wireless control network system such as a wireless sensor network, and so forth via, for example, an access point (not shown).

More specifically, the wireless nodes 11 to 15 each comprise a communication means for transmitting measurement data • process control data, as measured by itself, or executing transmit/receive of respective communication packet data blocks of the first wireless communication, received from other wireless nodes 11 to 15, via wireless communication, an arithmetic and control means such as a CPU for controlling the wireless node in whole, thereby causing the wireless node to operate as a field device, and transmitting the measurement data • process control data, as obtained, or the respective communication packet data blocks received from the other wireless nodes to the GW2, and a storage means such as, for example, a RAM, a ROM, and so forth, for storing various information, such as an OS, in the main, a program, and an application for running the wireless nodes 11 to 15, respectively, path information (network information such as IP address, MAC address, and so forth) on a path of data in use upon the execution of the program, and so forth, from the wireless node itself to the other wireless nodes 11 to 15, GW2, and so forth respectively.

The GW2 comprises a packet-control means 21 for writing priority information in the header of a communication packet data block of the first wireless communication, received from any of the wireless nodes 11 to 15, thereby transmitting the communication packet data block with a hash value of the header, added thereto, a wireless communication means for executing transmit/receive of the communication packet data blocks of the first wireless communication via the wireless nodes 11 to 15, respectively, and wireless communication, a communication means for executing transmit/receive of the communication packet data of the first wireless communication with the QoS server 5, an arithmetic and control means such as a CPU for controlling the GW2 in whole, and transferring the respective communication packet data blocks received from the wireless nodes 11 to 15, respectively, to the QoS server 5, and a storage means, such as a RAM, a ROM, and so forth, for storing various information, such as the OS, in the main, a program, and an application for running the GW2, and path information (network information such as the IP address, MAC address, and so forth) on a path of data in use upon the execution of the program, and so forth, from the GW2 itself up to the wireless nodes 11 to 15, respectively, and the QoS server 5, and so forth.

Further, the GW2 may comprise, in addition to the configuration thereof, described as above, a time-stamp control means 22 for, upon receiving a communication packet data block of the first wireless communication, adding a time-stamp field to the header of the communication packet data block to write a time-stamp therein.

Furthermore, the packet-control means 21 of the GW2 may, in addition to the configuration thereof, described as above, recalculate a checksum of the header of the communication packet data block of the first wireless communication to be written in the header of the communication packet data block.

The wireless nodes 31 to 35 each are a field device, such as, for example, the maintenance terminal for maintenance work to be performed by a worker at a job site, the monitoring camera of which communication of massive data (for example, statistical data, a moving image, a still image, various image data blocks, and so forth) is required, and so forth, having a wireless communication function for wireless transfer of the various measurement data blocks through the Wi-Fi wireless communication.

Those wireless nodes 31 to 35 each are the field device, such as, for example, the maintenance terminal for maintenance work to be performed by a worker at a job site, the monitoring camera of which communication of massive data (for example, statistical data, a moving image, a still image, various image data blocks, and so forth) is required, a computer for executing, for example, voice communication, and so forth, the wireless nodes 31 to 35 executing the second wireless communication in conformity with IP, and the wireless communication standard differing from the first wireless communication standard, such as the Wi-Fi wireless communication, and so forth, thereby constructing a wireless network via an access point (not shown), and so forth.

More specifically, the wireless nodes 31 to 35 each comprise a communication means for transmitting the massive data, such as the statistical data, the moving image, the still image, the various image data blocks, and so forth, or executing transmit/receive of respective communication packet data blocks of the second wireless communication, from other wireless nodes 31 to 35, via wireless communication, an arithmetic and control means such as a CPU for controlling the wireless node in whole, and transmitting the massive data, such as the statistical data, the moving image, the still image, the various image data blocks, and so forth, or the respective communication packet data blocks received from other wireless nodes, respectively, to the AP4, and a storage means such as, for example, a RAM, a ROM, and so forth, for storing various information, such as the OS, in the main, a program, and an application for running the wireless nodes 31 to 35, respectively, path information (network information such as the IP address, MAC address, and so forth) on a path of data in use upon the execution of the program, and so forth, from the field device itself up to other wireless nodes, respectively, the AP4, and so forth.

The AP4 comprises a packet-control means 41 for zero-clearing part or the whole of priority information on the header of a communication packet data block of the second wireless communication, received from any of the wireless nodes 31 to 35, to (00000000), or changing the same to a predetermined value (00000001, and so forth), and adding a hash value of the header to the communication packet data block before transmission, a wireless communication means for executing transmit/receive of the communication packet data blocks of the first wireless communication via the wireless nodes 31 to 35, respectively, and wireless communication, a communication means for executing transmit/receive of the communication packet data of the first wireless communication with the QoS server 5, an arithmetic and control means such as a CPU for controlling the AP4 in whole, and transferring the respective communication packet data blocks received from the wireless nodes 31 to 35, respectively, to the QoS server 5, and a storage means, such as, for example, a RAM, a ROM, and so forth, for storing various information, such as the OS, in the main, a program, and an application for running the repeater as the AP4, and path information (network information such as IP address, MAC address, and so forth) on a path of data in use upon the execution of the program, and so forth, from the AP4 itself up to the wireless nodes 31 to 35, respectively, and the QoS server 5, and so forth.

Meanwhile, the packet-control means 41 of the AP4 may change the priority information in the header of the communication packet data block of the second wireless communication to information lower in priority than the priority information written in the header of the communication packet data block by the packet-control means 21 of the GW2.

Further, the packet-control means 41 of the AP4 may, in addition to the configuration thereof, described as above, recalculate a checksum of the header of the communication packet data block of the second wireless communication to be written in the header of the communication packet data block.

Furthermore, the AP4 may, in addition to the configuration thereof, described as above, comprise a time-stamp control means 42 for, upon receiving the communication packet data block of the second wireless communication, adding a time-stamp field to the header of the communication packet data block, and writing a time-stamp therein.

The QoS server 5 comprises a communication means for executing transmit/receive of communication packet data with the GW2, or the AP4, a wireless communication means for executing transmit/receive of communication packet data with the QoS server 6 via the network 100, a priority-control means 51 for applying priority control to the header of the communication packet data received from the GW2, or the AP4, on the basis of the priority information, thereby controlling the communication means before transmitting the communication packet data to the control system 200, an arithmetic and control means such as a CPU for controlling the QoS server 5 in whole, and applying priority control to the header of the communication packet data received from the GW2, or the AP4, by use of the priority-control means, before transferring the communication packet data to the QoS server 6, and a storage means such as, for example, a RAM, a ROM, and so forth, for storing various information, such as the OS, in the main, a program, and an application for running the repeater as the QoS server 5, path information (network information such as the IP address, MAC address, and so forth) on a path of data in use upon the execution of the program, and so forth, from the QoS server itself up to the GW2, or the AP4, the network 100, the QoS server 6, and so forth.

Further, the QoS server 5 may, in addition to the configuration thereof, described as above, comprise a correctness-inspection means 52 for inspecting correctness on the basis of a hash value of communication packet data received from the GW2, or the AP4, and controlling the communication means, thereby transmitting correct communication packet data to the control system 200.

Further, the QoS server 5 may, in addition to the configuration thereof, described as above, comprise a time-stamp control means 53 for, upon receiving communication packet data, adding a time-stamp field to the header of the communication packet data, and writing a time-stamp is therein. In this case, the correctness-inspection means 52 may inspect correctness depending on whether or not the communication packet data is received by the QoS server 5 itself after a lapse of predetermined time from a time stamp in the communication packet data as received.

Still further, the arithmetic and control means of the QoS server 5 may, in addition to the configuration thereof, described as above, recalculate a checksum of the header of the communication packet data received from the GW2, or the AP4 to be written in the header of the communication packet data.

The QoS server 6 comprises a wireless communication means for executing transmit/receive of communication packet data from the QoS server 5 via the network 100, a communication means for executing transmit/receive of the communication packet data with the control system 200, a priority-control means 61 for applying priority control to the header of the communication packet data received from the QoS server 5 via the network 100, on the basis of priority information, thereby controlling the communication means before transmitting the communication packet data to the control system 200, an arithmetic and control means such as a CPU for controlling the QoS server 6 in whole, and applying priority control to the header of the communication packet data received from the QoS server 5 via the network 100, by use of the priority-control means, before transferring the communication packet data to the control system 200, and a storage means, such as, for example, a RAM, a ROM, and so forth, for storing various information, such as the OS, in the main, a program, and an application, for running the repeater as the QoS server 6, path information (network information such as the IP address, MAC address, and so forth) on a path of data in use upon the execution of the program, and so forth, from the QoS server 6 itself up to the network 100, the control system 200, and so forth, respectively.

Meanwhile, the QoS server 6 may, in addition to the configuration thereof, described as above, comprise a correctness-inspection means 62 for inspecting correctness on the basis of a hash value, or a checksum of respective communication packet data blocks received from the QoS server 5 via the network 100, and controlling the communication means, thereby transmitting correct communication packet data to the control system 200.

Further, the QoS server 6 may, in addition to the configuration thereof, described as above, comprise a time-stamp control means 63 for, upon receiving communication packet data, adding a time-stamp field to the header of the communication packet data, and writing a time-stamp therein. In this case, the correctness-inspection means 62 may inspect correctness depending on whether or not the communication packet data is received by the QoS server 6 itself after a lapse of predetermined time from a time stamp in the communication packet data as received.

Still further, the arithmetic and control means of the QoS server 6 may, in addition to the configuration thereof, described as above, recalculate a checksum of the header of the communication packet data received from the QoS server 6 via the network 100 to be written in the header of the relevant communication packet data.

The network 100 is comprised of a terminal, or a repeater, an access point, and so forth (such field devices are not shown), for executing wireless communication by Wi-Fi, or WiPax, and so forth, the network 100 being coupled with the QoS server 5, and the QoS server 6, thereby executing transmit/receive (relay) of communication packet data.

The control system 200 executes collection • monitoring of sensor data from each of the wireless nodes 11 to 15, and an operation of an actuator, and as an example of the control system 200, there is cited an instrumentation system containing DCS (Distributed Control Systems). The control system 200 may be of any specific configuration provided that it is capable of controlling the wireless nodes, and monitoring process control, and measurement data in a wireless control network management system.

The control system 200 may have a system configuration comprised of, for example, a plurality of networks disjoined from each other at Level 1, Level 2, Level 3, Level 3. 5, and Level 4, respectively, as shown in FIG. 1.

In this case, the network at Level 1 is a control network composed of field devices comprising a sensor function for measuring a physical quantity such as temperature, a flow rate, and so forth, or an actuator function for controlling a control valve, and so forth, the control network executing transmit/receive of various measurement data blocks • control data blocks.

The network at Level 2 is a control network made up of a plurality of field devices such as controllers for controlling the field devices, such as a valve, a control valve, and so forth, making up the network at Level 1. The controllers each are connected to the network at Level 1 to receive the various measurement data blocks from the field devices making up the network at Level 1. Further, when control data transmitted from the controller is inputted to the respective field devices making up the network at Level 1, the respective field devices operate on the basis of the control data (for example, the controller is caused to adjust the opening thereof).

The network at Level 3 is connected to the network at Level 2 via layer-2 switches, being composed of a plurality of control servers for accumulating • storing the various measurement data blocks and control data blocks, received from the respective controllers, the control servers grasping long term trends of the various data blocks.

The network at Level 3. 5 is a DMZ (Demilitarized Zone) that is connected to the network at Level 3 via a layer-2 switch, and a firewall device, representing an area isolated from external networks, and internal networks, respectively, by means of a firewall. In FIG. 1, the network at Level 3. 5 is connected to the QoS server 6 to be further connected to the QoS server 5, the AP4, and the GW2, respectively, via the network 100, as one embodiment of the invention.

The network at Level 4 is a control • management network composed of a plurality of control servers for controlling a wireless sensor network made up of the wireless nodes 11 to 15, and so forth, the network at Level 4 being connected to the network at Level 3. 5 (DMZ) via a layer-3 switch, a firewall device, and so forth.

The respective control servers of the control • management network are capable of transmitting control data to at least any of the wireless nodes 11 to 15, as a target for control, via the DMZ, the QoS server 6, the QoS server 5, and the GW2, on the basis of communication packet data received from any of the wireless nodes 11 to 15 via the QoS server 5, the network 100, the QoS server 6, and the DMZ, in order to control the wireless nodes 11 to 15, respectively, as necessary.

(Explanation about Operation)

Figure 2:
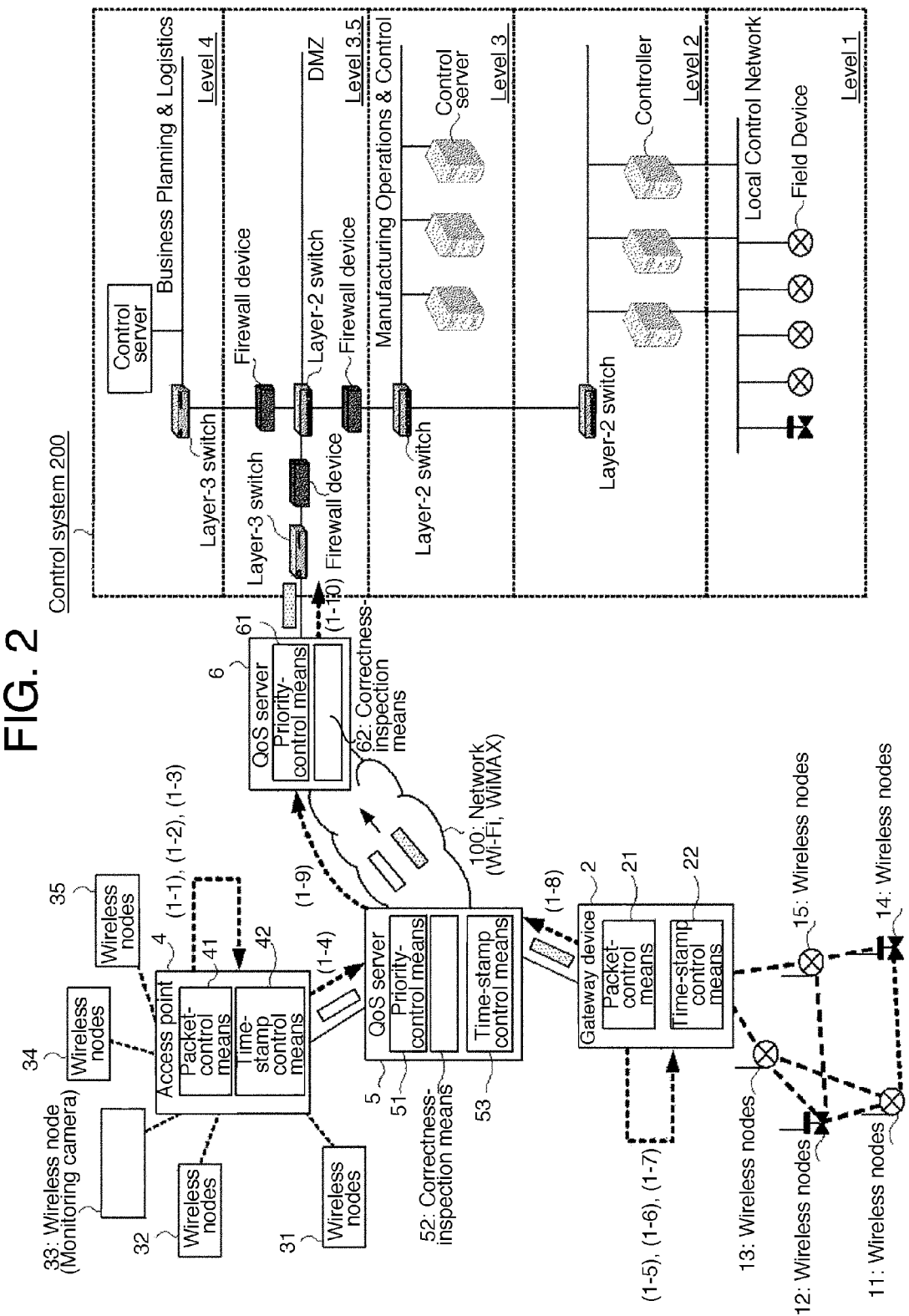
FIG. 2 is a schematic diagram for explaining about operation of the control network management system according to the invention.
Figure 3A:
FIGS. 3(A), 3(B) each are a schematic representation showing a format of related-art communication packet data.
Figure 3B:
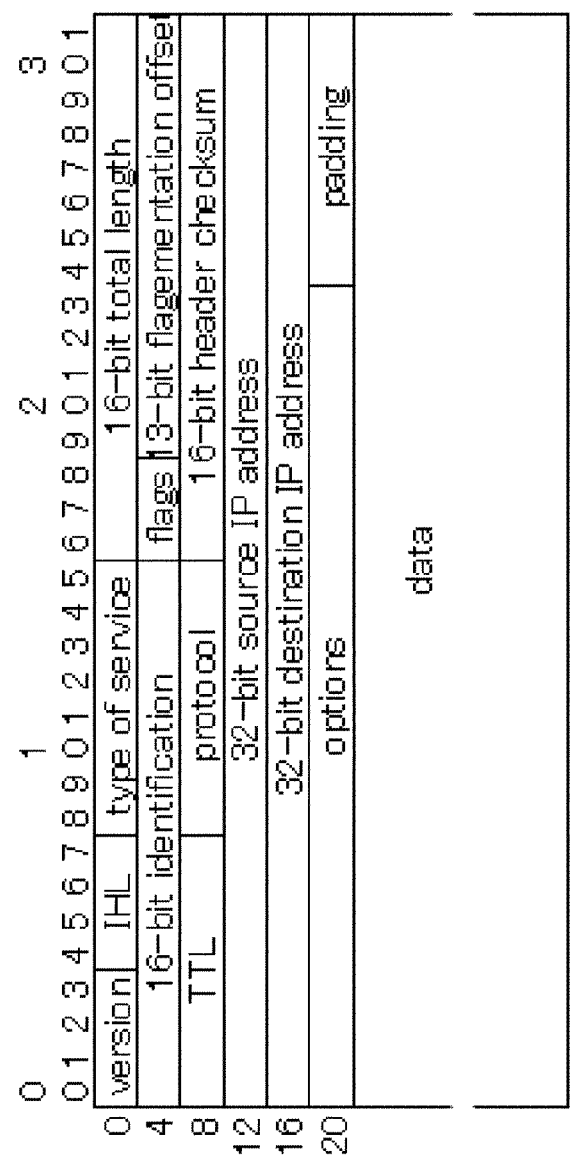

A control network management system according to the invention, configured as above, can execute, for example, operations described as follows. FIG. 2 is a schematic diagram for explaining about operation of the control network management system according to the invention, and the operation is described by referring to operation steps taken in succession from steps (1-1) to (1-10), as depicted in FIG. 2.

(1-1)

The packet-control means 41 of the AP4, upon receiving communication packet data of the second wireless communication, from any of the wireless nodes 31 to 35, via the communication means, zero-clears part or the whole of information (TOS information) in the TOS field in the header of the communication packet data, as received (to, for example, 00000000), or changes the same to a predetermined value (00000001), recalculating a checksum of a 16-bits header in the IP header to be written in the header of the communication packet data.

Further, the packet-control means 41 of the AP4, upon receiving of the communication packet data of the second wireless communication, from any of the wireless nodes 31 to 35, may duplicate the communication packet data, in which case, priority information is written in the TOS field in the header of the communication packet data as duplicated, and the checksum of the 16-bits header in the IP header is recalculated to be written in the header of the communication packet data, as duplicated.

Still further, the packet-control means 41 of the AP4 may change the priority information written in the TOS information in the header of the communication packet data of the second wireless communication to priority information lower in priority than the priority information written in the header of the communication packet data by the packet-control means 21 of the GW2.

Further, the packet-control means 41 of the AP4 may execute right-shift of leading 4-bits out of TOS information 8-bits in the header by 4-bits to thereby zero clear the leading 4-bits.

By so doing, the QoS server 5 is able to handle the communication packet data of the first wireless communication, transmitted from the GW2, as the communication packet data higher in priority than the communication packet data transmitted from the AP2, so that this is effective in that a signal of the process control wireless communication of which highly real-time responsiveness is required while guaranteeing priority, and a signal of which real time responsiveness is not required so much are allowed to coexist on the same network.

(1-2)

The time-stamp control means 42 of the AP4 adds a time-stamp field from octet 24 to 27 to be written in the header of the communication packet data block (or the communication packet data block as duplicated), thereby writing 32-bits time-stamp therein.

In other words, the time-stamp control means 42 of the AP4 newly prepares a time-stamp field in (the header) of the communication packet data of the second wireless communication, received from any of the wireless nodes 31 to 35, thereby writing a time-stamp therein.

(1-3)

The packet-control means 41 of the AP4 calculates a hash value (from octet 0 to 27) in the header of the communication packet data block (or the communication packet data block as duplicated).

(1-4)

The packet-control means 41 of the AP4 adds the hash value as calculated to the communication packet data block (or the communication packet data block as duplicated) to be transmitted to the QoS server 5.

More specifically, the packet-control means 41 of the AP4 newly prepares a hash-value field in (the header of) the communication packet data block of the second wireless communication received from any of the wireless nodes 31 to 35, and writes a hash value as calculated therein before transmitting the communication packet data block to the QoS server 5.

That is, upon receiving the communication packet data block of the second wireless communication from any of the wireless nodes 31 to 35, the packet-control means 41 of the AP4 adds new information (a time-stamp field, a hash-value field, and TOS priority information) into the header of the communication packet data to be transmitted to the QoS server 5.

(1-5)

The packet-control means 21 of the GW2, upon receiving communication packet data of the first wireless communication from any of the wireless nodes 11 to 15 via the communication means, writes priority information in the TOS field in the header of the communication packet data as received, and recalculates a checksum of a 16-bits header in the IP header to be written in the header of the relevant communication packet data block.

Meanwhile, the packet-control means 21 of the GW2, upon receiving communication packet data of the second wireless communication from any of the wireless nodes 11 to 15, may duplicate the relevant communication packet data, in which case, priority information may be written in the TOS field in the header of the communication packet data as duplicated, and a checksum of a 16-bits header in the IP header is recalculated to be written in the header of the relevant communication packet data.

Herein, the packet-control means 21 of the GW2 writes bits higher in priority than bits written in the AP4, in the TOS field in the header of the communication packet data of the second wireless communication, however, assuming that priority is expressed by, for example, the leading 4-bits out of TOS information 8-bits in the header, lower 4-bits may be zero cleared.

(1-6)

A time-stamp control means 22 of the GW2 adds a time-stamp field from octet 24 to 27 in the header of the communication packet data block (or the communication packet data block as duplicated), thereby writing 32-bits time-stamp therein.

In other words, the time-stamp control means 22 of the GW2 newly prepares a time-stamp field in (the header) of communication packet data of the first wireless communication, received from any of the wireless nodes 11 to 15, thereby writing a time-stamp therein.

(1-7)

The packet-control means 21 of the GW2 calculates a hash value (from octet 0 to 27) in the header of the communication packet data block (or the communication packet data block as duplicated).

More specifically, the packet-control means 21 of the GW2 newly prepares a hash value field in (the header) of the communication packet data of the second wireless communication, from any of the wireless nodes 31 to 35, having received a signal, thereby writing a calculated hash value therein to be transmitted to the QoS server 5.

(1-8)

The packet-control means 21 of the GW2 adds the calculated hash value to the communication packet data block (or the communication packet data block as duplicated) to be transmitted to the QoS server 5.

More specifically, the packet-control means 21 of the GW2, upon receiving the communication packet data of the first wireless communication from any of the wireless nodes 11 to 15, adds new information (the time-stamp field, the hash value field, the priority information in the TOS field) into the header of the relevant communication packet data to be transmitted to the QoS server 5.

The sequence of respective operations in the steps (1-1) to (1-4), and the sequence of respective operations in the steps (1-5) to (1-8) are not limited to the forgoing example.

(1-9)

The priority-control means 51 of the QoS server 5 applies priority control to the header of communication packet data received from the GW2, or the AP4, via the communication means, on the basis of the priority information, controlling the communication means according to an output queue of the packet data as received, thereby transmitting a packet higher in priority to the QoS server 6 via the network 100.

Further, in addition to this operation, the correctness-inspection means 52 of the QoS server 5 may compare a hash value of communication packet data received from the GW2, or the AP4, with a hash value worked out from the relevant communication packet data with the use of a hash function provided in advance, thereby inspecting correctness depending on whether or not the respective hash values match each other, and if so, the correctness-inspection means 52 may decide the communication packet data as correct, thereby controlling the communication means, and transmitting correct communication packet data to the QoS server 6 via the network 100.

Still further, in addition to the operation described as above, the correctness-inspection means 52 of the QoS server 5 may write a 32-bits time stamp in the time-stamp field in the header of the communication packet data (or the communication packet data as duplicated), Yet further, in addition to the operation described as above, the correctness-inspection means 52 of the QoS server 5 may compare a checksum of communication packet data, written in the header of the communication packet data of the respective wireless communications, as received, with a checksum newly worked out from the relevant communication packet data, thereby inspecting matching property of the communication packet data, depending on whether or not the respective checksums match each other, and if so, the correctness-inspection means 52 may decide that the matching property is obtained, thereby transmitting the communication packet data having the matching property, to the QoS server 6 via the network 100.

Furthermore, in addition to the operation described as above, the correctness-inspection means 52 of the QoS server 5 may inspect correctness on the basis of a time-stamp written in the communication packet data of the wireless communication, received from the GW2, or the AP4, depending on whether or not the communication packet data is received by the QoS server 5 itself after a lapse of predetermined time from the time stamp in the communication packet data, as received, and if it is received within the predetermined time, the correctness-inspection means 52 may decide that the communication packet data is correct, thereby transmitting correct communication packet data to the QoS server 6 via the network 100.

(1-10)

The priority-control means 61 of the QoS server 6 applies priority control to the header of communication packet data received from the QoS server 5 via the network 100, on the basis of priority information, controlling the communication means according to an output queue of the packet as received, thereby transmitting communication packet data higher in priority to a control system.

For example, the priority-control means 61 of the QoS server 6 applies priority control to the headers of respective communication packet data received from the QoS server 5 via a communication means (not shown) before transmitting the respective communication packet data to the DMZ of the control system.

The communication packet data from the QoS server 6 is transferred to the control • management network depicted at Level 4 via DMZ. The respective control servers that male up the control • management network transmit control data to at least any of the wireless nodes 11 to 15, as the target for control, via DMZ, the QoS server 6, the QoS server 5, and the GW2, on the basis of the communication packet data as received, in order to control the wireless nodes 11 to 15, respectively, as necessary.

Further, in addition to the operation in the step (1-10) as above, the correctness-inspection means 62 of the QoS server 6 may compare a hash value of respective communication packet data received from the QoS server 5 with a hash value worked out from the relevant communication packet data block with the use of the hash function provided in advance, thereby inspecting correctness depending on whether or not the respective hash values match each other, and if so, the correctness-inspection means may decide the communication packet data as correct, thereby controlling the communication means, and transmitting correct communication packet data to the control system.

For this reason, the present invention is effective in that the correctness of the communication packet data is inspected on the basis of the hash value of the respective communication packet data received by the correctness-inspection means of the QoS server 6, and the correct communication packet data is transmitted to the control system by controlling the communication means, thereby enabling tampering, and so forth, by a mala fide third party, to be avoided.

Further, in addition to the operation in the step (1-10) as above, the time-stamp control means 62 of the QoS server 6 may write a 32-bits time-stamp in the time-stamp field in the header of the communication packet data block (or the communication packet data block as duplicated).

Still further, in addition to the operation described as above, the correctness-inspection means 62 of the QoS server 6 may compare a checksum of communication packet data, written in the header of the communication packet data of the respective wireless communications, as received, with a checksum newly worked out from the relevant communication packet data, thereby inspecting matching properties of the respective checksums, depending on whether or not the respective checksums match each other, and if so, the correctness-inspection means 62 may decide that the matching property is obtained, thereby transmitting the communication packet data having the matching property, to the control system.

In addition to the operation described as above, the correctness-inspection means 62 of the QoS server 6 may inspect correctness depending on whether or not communication packet data is received by the QoS server 6 itself after a lapse of the predetermined time from the time stamp in the communication packet data as received, on the basis of the time stamp written in the communication packet data of the wireless communication, received from the QoS server 5, and if it is received within a predetermined time, the correctness-inspection means 62 may decide that the communication packet data is correct, thereby transmitting correct communication packet data to the control system.

Further, with the network 100 for transferring communication packet data between the QoS server 5, and the QoS server 6, all the repeaters (not shown), such as a router, a switch, and so forth, making up the network 100, may check TOS, a hash value, and a time stamp, and such a configuration as above is effective in that guarantee of the priority control function QoS is further enhanced.

As a result, the control network management system according to the invention is provided with the first repeater having the packet control means for writing priority information on the header of communication packet data of the first wireless communication, as received, and transmitting the communication packet data with the hash value of the header, added thereto, the second repeater having the packet control means for zero-clearing part, or the whole of the priority information in the header of communication packet data of the second wireless communication, as received, or changing the priority information to the predetermined value before transmitting the communication packet data with the hash value of the header, added thereto, and the third repeater having the priority control means for applying the priority control to the headers of the respective communication packet data received from the first repeater, and the second repeater, on the basis of the priority information, thereby transmitting the communication packet data to the control system 200, so that the system is effective in that tampering, and so forth, by the mala fide third party, is avoided, and the signal of the process control wireless communication of which highly real-time responsiveness is required while guaranteeing priority, and the signal of which real-time responsiveness is not required so much are allowed to coexist on the same network.

Other Embodiments

Further, with the control network management system according to the invention, the following operations may be executed in addition to the steps (1-1) to (1-10) previously explained about under (Explanation about operation).

For example, with the packet-control means 21 of the GW2, or the packet-control means 41 of the AP4, calculation of a value from octet 28 to 31 may take precedence over other operations.

Further, in this case, as for the initial-value (salt) serving as a base for working out a hash value with the use of one-way function, authentication of a data source may be executed between the GW2, and the wireless nodes 11 to 15, and between the AP4, and the wireless nodes 31 to 35, respectively.

More specifically, the control network management system according to the invention may be provided with an initial-value master (not shown) for generating the initial-value (salt) to be used in calculating the hash value, thereby distributing the initial-value to respective devices such as the GW2, the AP4, the QoS server 5, the QoS server 6, and so forth.

Still further, with the control network management system according to the invention, the wireless nodes 11 to 15, the GW2, the wireless nodes 31 to 35, the AP4, QoS server 5, QoS server 6, and so forth, respectively, may adopt a configuration wherein, for example, a public key algorithm, digital signature scheme, time-stamp format, and time-setting scheme (including an error scope), to be used, are predetermined, and communication is executed in conformity therewith in order to secure security between propagations of communication packet data.

The system is effective in that the security between the propagations of communication packet data can be secured by so doing, and as a result, tampering, and so forth, by a mala fide third party, can be avoided.

With such configurations as described above, for example, the following operation is executed.

Design • production venders (Va, Vb, Vc, Vd, and so forth) of the GW2, AP4, QoS server 5, and QoS server 6, respectively, prepare a company's public keys • secret keys, in pairs, {KP (Va), KP (Vb), KP (Vc), KP (Vd), and so forth}, and the storage means of the GW2, AP4, QoS server 5, and QoS server 6, respectively, store those public keys.

Meanwhile, in this case, Va denotes a vender A, Vb denotes a vender B, and so on, while KP (Va) denotes the keys in pairs, of a vender a, KPs (Va) denotes the secret keys of KP (Va), and KPp (Va) denotes the public keys of KP (Va). That is, KP (Va) is a pair of KPp (Va), and KPs (Va). The same can be said of KP (Vb) to KP (Vd), respectively, however, description thereof is omitted herein.

Those public keys each are signed by a secret key KPs (T) among public keys in pairs {KP (T), KPp (T), and KPs (T)}, prepared by an authentication station server managed by a reliable group pre-selected by the respective venders to be made public in the form of a public key certificate by the relevant group.

The public keys of the relevant group, and the public key certificate (a self-certificate) are notified to the respective venders via safe paths, not less than two paths (Fax, registered mail, and so forth).

The storage means of the GW2, AP4, QoS server 5, and QoS server 6, and so forth, respectively, store the public key certificate (further, the public key certificate may be stored in a smart chip having anti-tampering characteristics, and so forth).

With the configuration described as above, if the configuration depicted in FIG. 1 is adopted, the respective devices, such as the GW2, the AP4, the QoS server 5, the QoS server 6, and so forth, may be joined with (the network of) the control network management system according to the invention as follows:

(A) The respective devices, such as the GW2, the AP4, the QoS server 5, the QoS server 6, and so forth, notify information on whether a manufacturer is a company A, or a company B, and so forth, to other devices participating in the network of the control network management system through broadcasting, together with the public key certificate and so forth, signed by each device.

(B) The device that has received a notification sends back the public key certificate signed by itself, incorporating the device's own information, to the device that has transmitted the notification through broadcasting (has introduced itself).

(C) A time master (unit) to serve as a time reference in (the network of) the control network management system, among the devices participating in the network, notifies a signed time of (the network of) the relevant control network management system to the respective devices that have joined the system, such as the GW2, the AP4, the QoS server 5, the QoS server 6, and so forth.

By so doing, the respective devices, such as the GW2, the AP4, the QoS server 5, the QoS server 6, and so forth, making up the control network management system according to the invention, are able to obtain the public keys with a signature of the group mutually reliable from end to end, affixed thereto, thereby setting a time to the time master.

In this connection, the time master is for causing the respective devices that participate in the network to set a time at predetermined intervals, and in particular, for promoting distribution of the initial-value (salt) for use in working out the hash value for an initial-value master.

Further, the respective devices may encipher communications between the respective devices on the basis of the public keys of other devices developed as above, and secret keys, as the public keys in pairs, of the respective devices themselves, stored in the storage means thereof, thereby executing transmit/receive of communication packet data. By so doing, it is possible to prevent tampering of the header of communication packet data, and a tampering attack on signal priority, thereby forestalling the replay attack (tampering, and so forth, attempted by a mala fide third party, can be avoided), in which respect, the system is effective.

Further, the respective constituent elements of the control network management system according to the invention may aim at RFI (Request for Information) under study in WG15 of the ISA standard concerning process control wireless communication {ISA100. 11a concerning process control wireless communication (Wireless systems for industrial automation: Process control and related applications)}, the respective constituent elements having a function capable of implementing the above-mentioned.

Thus, since the control network management system according to the invention is provided with the first repeater having the packet control means for writing priority information in the header of the communication packet data of the first wireless communication, as received, and transmitting the communication packet data with the hash value of the header, added thereto, the second repeater having the packet control means for zero-clearing part, or the whole of priority information in the header of the communication packet data of the second wireless communication, as received, or changing the priority information to the predetermined value before transmitting the communication packet data with the hash value of the header, added thereto, and the third repeater having the priority control means for applying priority control to the headers of respective communication packet data blocks received from the first repeater, and the second repeater, on the basis of the priority information, thereby transmitting the communication packet data to the control system, it is possible to prevent the tampering on the header of communication packet data, and the tampering attack on signal priority, thereby forestalling the replay attack (tampering, and so forth, attempted by the mala fide third party, can be avoided). In addition, the signal of the process control wireless communication of which highly real-time responsiveness is required while guaranteeing priority, and the signal of which real-time responsiveness is not required so much are allowed to coexist on the same network. The system is therefore effective in respect of those points described as above.

(Additional Claim 1)

A control network management system for relaying a first wireless communication in conformity with IP (Internet Protocol), and a process control wireless communication standard, and a second wireless communication in conformity with IP, and a wireless communication standard differing from the standard, the control network management system comprising a first repeater having a packet control means for writing priority information in a TOS (Type of Service) field of the header of communication packet data of the first wireless communication, and calculating a hash value of the header, before transmitting the communication packet data with the hash value added thereto, a second repeater having a packet control means for deleting priority information in a TOS field of the header of communication packet data of the second wireless communication, or changing the priority information to priority information lower in priority than the priority information given to the TOS field by the packet-control means of the first repeater, and calculating a hash value of the header before transmitting the communication packet data with the hash value added thereto, and a third repeater comprising a correctness-inspection means for inspecting correctness on the basis of a hash value of the communication packet data of the first wireless communication, or the second wireless communication, received from the first repeater, or the second repeater, respectively, and a priority-control means for applying priority control to the header of the communication packet data received from the first repeater, or the second repeater, respectively, on the basis of priority information, thereby transmitting correct communication packet data that is high in priority to a control system.

(Additional Claim 2)

The control network management system according to claim 1, wherein the packet control means of the first repeater writes priority information higher in priority than the priority information given to the TOS field by the packet-control means of the third repeater, in the communication packet data of the first wireless communication, and the packet control means of the second repeater writes priority information lower in priority than the priority information given to the TOS field by the packet-control means of the first repeater, in the communication packet data of the second wireless.

(Additional Claim 3)

The control network management system according to any of claims 5 to 7, wherein the correctness-inspection means of the third repeater inspects correctness depending on whether or not received communication packet data of the first wireless communication, or the second wireless communication is received by the third repeater itself after a lapse of predetermined time from the time stamp written in the respective communication packet data.

The control network management system according to the invention is effective in that the control network management system is provided with the first repeater having the packet control means for writing priority information in the header of the communication packet data of the first wireless communication, as received, and transmitting the communication packet data with the hash value of the header, added thereto, the second repeater having the packet control means for zero-clearing part, or the whole of priority information in the header of the communication packet data of the second wireless communication, as received, or changing the priority information to the predetermined value before transmitting the communication packet data with the hash value of the header, added thereto, and the third repeater having the priority control means for applying priority control to the headers of respective communication packet data blocks received from the first repeater or the second repeater, on the basis of the priority information, thereby transmitting the communication packet data to the control system, so that it is possible to prevent the tampering on the header of communication packet data, and the tampering attack on signal priority, thereby forestalling the replay attack (tampering, and so forth, attempted by the mala fide third party, can be avoided), and furthermore, the signal of the process control wireless communication of which highly real-time responsiveness is required while guaranteeing priority, and the signal of which real-time responsiveness is not required so much are allowed to coexist on the same network.

While the present invention has been shown and described with reference to certain exemplary embodiments thereof, other implementations are within the scope of the claims. It will be understood by those skilled in the art that various changes in form and details may be made therein without departing from the spirit and scope of the invention as defined by the appended claims.

What is claimed is:

1. A control network management system for relaying a first wireless communication in conformity with IP (Internet Protocol) and a process control wireless communication standard, and a Wi-Fi wireless communication in conformity with IP and a Wi-Fi wireless communication standard differing from the process control wireless communication standard, the control network management system comprising:

a first repeater having a packet control means for writing priority information in a header of communication packet data of the first wireless communication, as received and transmitting the communication packet data with a hash value of the header, added thereto;

a second repeater having a packet control means for zero-clearing part, or a whole of priority information in a header of communication packet data of the Wi-Fi wireless communication, as received, or changing the priority information to a predetermined value before transmitting the communication packet data with a hash value of the header, added thereto; wherein the Wi-Fi wireless communication is in conformity with the Wi-Fi wireless communication standard and the first wireless communication is in conformity with the process control wireless communication standard different from the Wi-Fi wireless communication standard, wherein the packet control means of the first repeater writes the priority information having a higher priority than the zero-cleared or changed priority information zero-cleared or changed by the packet control means of the second repeater;

wherein the packet control means of the second repeater changes the priority information in the header of the communication packet data of the Wi-Fi wireless communication to priority information lower in priority than the priority information written in the header of communication packet data of the first wireless communication by the packet control means of the first repeater;

a third repeater having a priority control means for applying priority control to the header of the communication packet data received from the first repeater or the second repeater, on the basis of priority information, thereby transmitting the communication packet data to a control system, wherein the third repeater comprises a correctness-inspection means for inspecting correctness on the basis of the hash value of the communication packet data received from the first repeater or the second repeater, to transmit correct communication packet to the control system; and a fourth repeater, the fourth repeater comprising a priority-control means for executing priority control on the basis of the priority information in the header of the communication packet data received from the third repeater, and a correctness-inspection means for inspecting correctness on the basis of the hash value of the communication packet data, to transmit correct communication packet data to the control system.

2. The control network management system according to claim 1, wherein the first repeater comprises a time-stamp control means for, upon receiving the communication packet data of the first wireless communication, adding a time-stamp field to the header of the communication packet data, thereby writing a time-stamp therein;

the second repeater comprises a time-stamp control means for, upon receiving the communication packet data of the Wi-Fi wireless communication, adding a time-stamp field to the header of the communication packet data, thereby writing a time-stamp therein; and the correctness-inspection means of the third repeater inspects correctness of the communication packet data on the basis of the time-stamp written in the communication packet data of the first wireless communication, or the Wi-Fi wireless communication, as received.

3. The control network management system according to claim 1, wherein the packet-control means of the second repeater as well as the first repeater write a recalculated checksum of the header of the respective headers of the communication packet data, and the correctness-inspection means of the third repeater inspects matching property of communication packet data, on the basis of the respective checksums written in the communication packet data of the respective wireless communications, as received, thereby transmitting communication packet data having the matching property, to the control system.

4. The control network management system according to claim 1, wherein:

the third repeater comprises a time-stamp control means for, upon receiving communication packet data, adding a time-stamp field to the header of the communication packet data, and writing a time-stamp therein; and the packet-control means for writing the recalculated checksum of the header in the respective headers of the communication packet data, wherein the correctness-inspection means of the fourth repeater inspects correctness of the communication packet data, on the basis of the time stamp written in the communication packet data of the wireless communication, received from the third repeater, further inspecting matching property of the communication packet data, on the basis of the checksum written in the communication packet data of the respective wireless communications, as received, before transmitting communication packet data having the matching property to the control system.

5. The control network management system according to claim 2, wherein:

the third repeater comprises a time-stamp control means for, upon receiving communication packet data, adding a time-stamp field to the header of the communication packet data, and writing a time-stamp therein; and the packet-control means for writing the recalculated checksum of the header in the respective headers of the communication packet data, wherein the correctness-inspection means of the fourth repeater inspects correctness of the communication packet data, on the basis of the time stamp written in the communication packet data of the wireless communication, received from the third repeater, further inspecting matching property of the communication packet data, on the basis of the checksum written in the communication packet data of the respective wireless communications, as received, before transmitting communication packet data having the matching property to the control system.

6. The control network management system according to claim 3, wherein:

the third repeater comprises a time-stamp control means for, upon receiving communication packet data, adding a time-stamp field to the header of the communication packet data, and writing a time-stamp therein; and the packet-control means for writing the recalculated checksum of the header in the respective headers of the communication packet data, wherein the correctness-inspection means of the fourth repeater inspects correctness of the communication packet data, on the basis of the time stamp written in the communication packet data of the wireless communication, received from the third repeater, further inspecting matching property of the communication packet data, on the basis of the checksum written in the communication packet data of the respective wireless communications, as received, before transmitting communication packet data having the matching property to the control system.

\* \* \* \* \*